April 28, 1953  C. A. M. E. ODOT  2,636,197
MILITARY BRIDGE

Filed April 14, 1948  4 Sheets-Sheet 1

Inventor
CHARLES Odot
By Robert E. Burns
Attorney

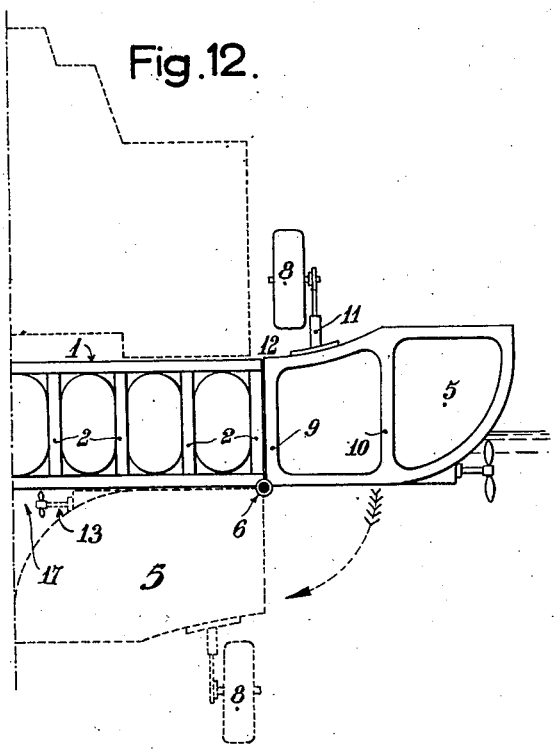
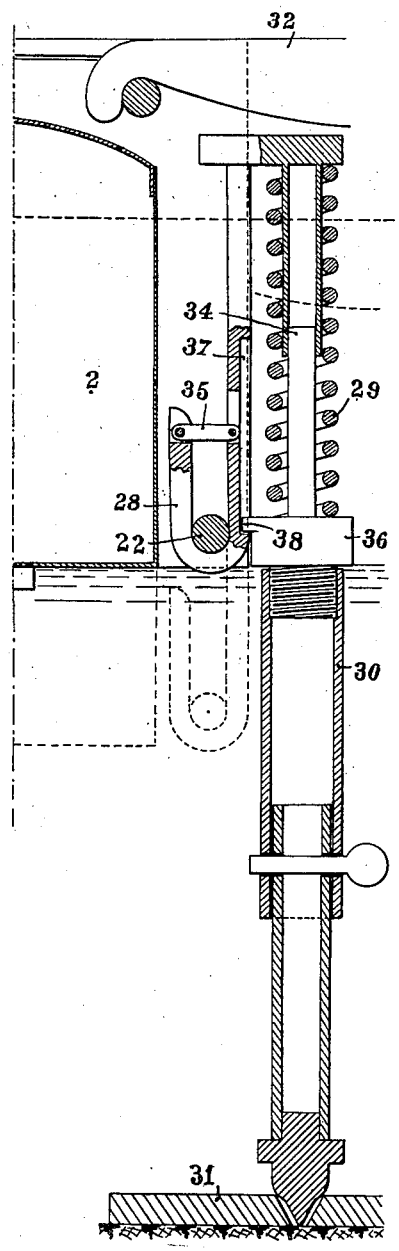
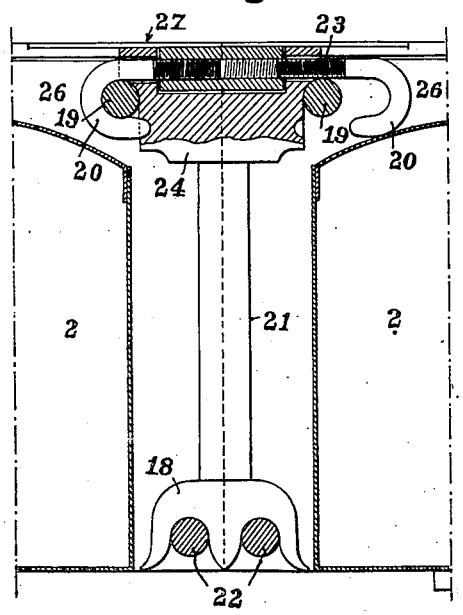

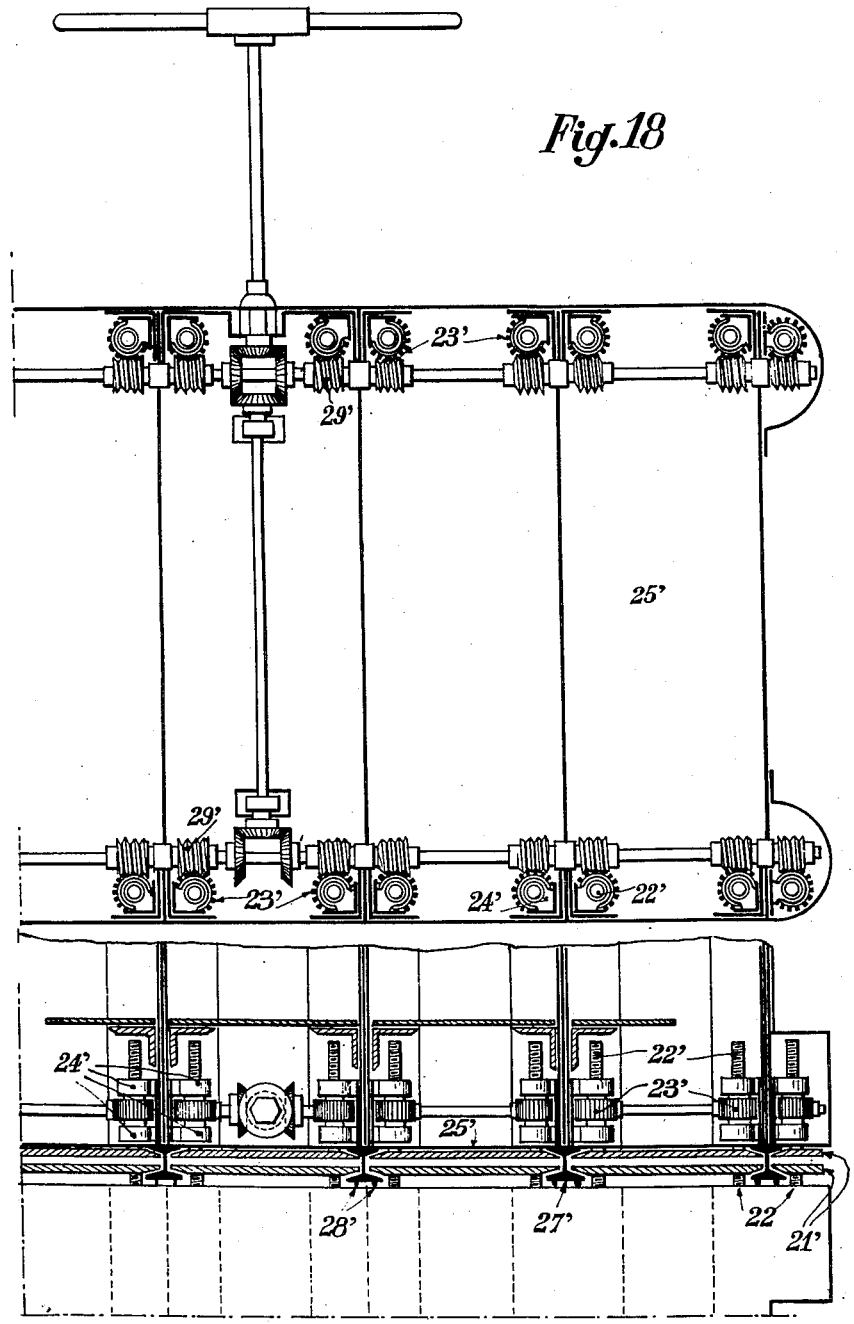

April 28, 1953   C. A. M. E. ODOT   2,636,197
MILITARY BRIDGE
Filed April 14, 1948   4 Sheets-Sheet 4
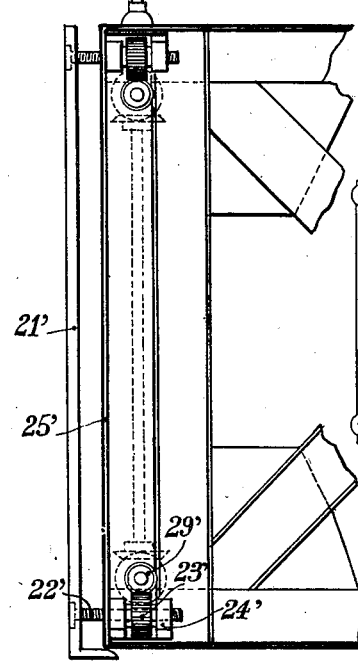
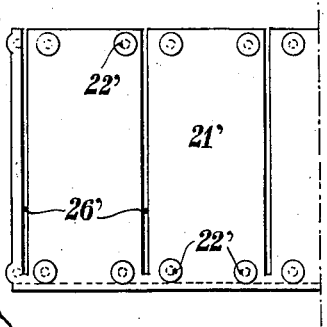
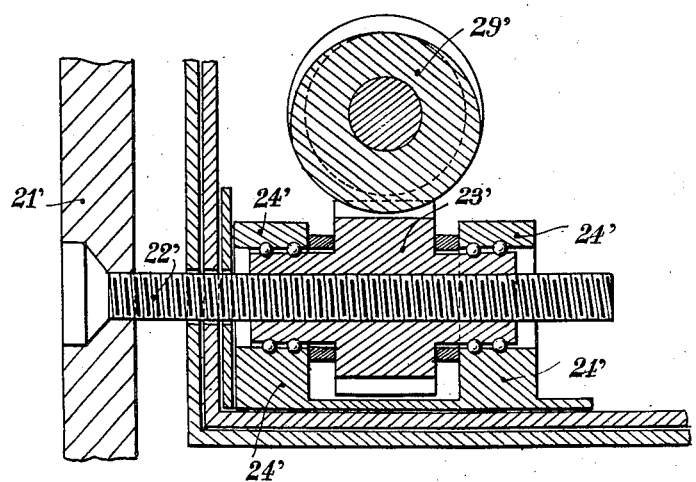
Inventor
Charles Odot
By Robert E. Burns
Attorney Patented Apr. 28, 1953

2,636,197

UNITED STATES PATENT OFFICE 2,636,197

MILITARY BRIDGE

Charles Alexis Marie Eugène Odot, Tou Koto,
French Sudan, Africa

Application April 14, 1948, Serial No. 20,856

1 Claim. (Cl. 14—27)

The main object of the invention is the building of a road bridge intended above all for the use of the army. The principal objective is to obtain a really light system of high carrying capacity and that may be easily and very quickly transported. For this special purpose use may be made of an aerial service that allows a greatly increased speed for the manoeuvres of the armoured divisions and airborne troops of a modern army, enlarges their radius of action and facilitates the surprise factor that is such a vital element for the success of any army operation that is carried out under present conditions. After going deeply into this subject, it seems that the glider offers the most suitable and cheapest means for bringing the equipment required close to the actual erection site, while the last few hundred metres before launching it in the water may be traversed over even rough ground in tow of a tractor or tank engaged in the neighbourhood. In case of necessity haulage over a road or railway track may be anticipated. The mechanization of the glider may be carried out or it may be used as a hydroplane. Various patterns of bridge may be built to suit the particular type of army transport to be carried. With the up-to-date technical advance in bridge building, the present method may provide material that is capable of carrying over the bridge a vehicle train of 100 tons.

As a guiding point, when the structural equipment is made wholly of Duralumin, a running metre of completed bridge to carry this latter train of 100 tons would weigh from 350 to 400 kgs.

A running meter of bridge structure capable of letting through vehicle trains of 16 tons would weigh about 150 kgs. The complete glider carrying 15 meters of bridge for 100 tons, including tackle and crew would weigh approximately 10 tons. An identical glider for 10 meters of bridge carrying 16 tons would weigh just about 3,500 kilos when fully loaded.

This really astonishing result is achieved by setting up an assembly of a continuous line of girders of the same cross-section that sit directly on a series of floats with a constant buoyancy coefficient. By means of charts and graphs, the unknown quantities can be found easily and these give the sizes of the girders and floats that of course will vary according to what is required and the demands of the army authorities. The attached drawings, therefore, do not lay down any hard and fast rules in regard to shape or sizes of the various constituent parts; they serve merely an explanatory purpose.

These drawings bring out the points of the invention clearly enough so that no effective benefit would be gained by a further accentuation of its great serviceableness. In said drawings.

Figure 9:
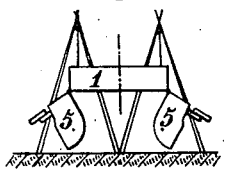
Figure 10:

Figs. 9 and 10 bring out one of the many means for turning round the side caissons as through derricks and pulley-blocks.

Figure 11:
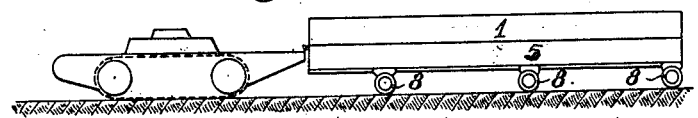

Fig. 11 shows a way of hauling the component parts of a normal bridge along the road or over rough ground.

Figure 5:
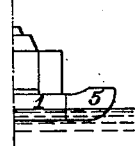
Fig. 5 is a half transverse section, shown diagrammatically, of a bridge section launched in the water; the standard load of 100 tons is represented therein.
Figure 6:
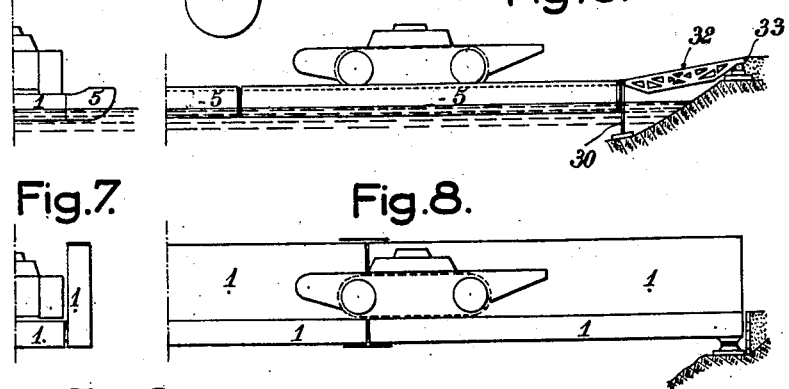
Fig. 6 illustrates a part longitudinal elevation of the bridge resting on the water; in the centre is one whole section connected up with the right bank by means of an assembly of special standards and a system of girders covered with planking; on the left is laid a section similar to the first one.

Fig. 12 is an enlargement of Fig. 5, giving some structural details of the caissons forming a bridge section.

Fig. 13 is a vertical longitudinal section of one of the semi-flexible supporting standards for the connection to the banks.

Fig. 14 is a longitudinal view, partly in section, showing a member used for carrying out the joint between the ends of the central caissons of two adjoining bridge sections.

Fig. 15 is a plan partly in section showing other means for carrying out the joint between the ends of the central caissons of two adjoining bridge sections.

Fig. 16 is a longitudinal half-section at the end of a central caisson with the connecting system of Fig. 5.

Fig. 17 is a half-elevation of an abutment plate and screws being part of said connecting system.

Fig. 18 is a sectional elevation of the end of the central caisson with said connecting system.

Fig. 19 is a longitudinal sectional view on a larger scale of details shown in Figs. 15 and 18 of the end of the central caisson.

The bridge of normal pattern is made up of a central caisson 1 and two side caissons 5. The central water-tight caisson comprises in principle the girders 2 of the pontoon; the latter are represented in Fig. 12 merely as an exemplification. Their number and shape depend on the strength of material and army service requirements. Uninterrupted connection of each girder through the joint is ensured by special fittings of which Figure 14 shows a type for use in practice that will be disclosed later on.

Figure 2:
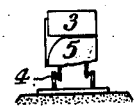
Fig. 2 illustrates an end view of half a float fitted for being carried on a rail track.

For the convenience of haulage by road or on rail tracks of sections of bridges intended to carry heavy vehicles and consequently having a large width, it would be practicable to divide the central caisson longitudinally into two symmetrically shaped portions 3 each carrying one of the two side caissons 5. An arrangement of this kind is indicated in Fig. 2, showing at 3, one of the two portions of a central caisson hingedly carrying one of the two side caissons 5. In this figure, in the position for haulage on the ground, the side caisson 5 is folded beneath the portion 3, and rigidly carries wheels 8 on which both of the elements bear on the road or rail.

The two watertight side caissons 5 are connected to the central caisson 1 by a hinge 6 and may be folded back under the latter into the position as shown in dotted lines in Figure 12.

Wheels 3 fitted to suit the requirements of army service may be attached thereto. At 12 there is provided an arrangement for fastening the side caisson to the central one.

At 13 is shown how to provide for the fitting up of any required number of propellers for allowing the easy manoeuvering on water of a bridge section in the shape of a raft. The whole assembly weighs so little that the underwater portion would amount to very little under normal conditions. This will only be appreciable (about 35 to 40 cm.) when heavy loads are going over the bridge. Anchoring will be carried out as for an ordinary pontoon section.

The length of a bridge section may vary, according to the particular model of bridge (the length changing with the carrying capacity specified) between 10 and 20 metres. With the exception of the connecting links, there are no attendant parts. Watertight bulkheads may be fitted up inside to restrict the effects of any shelling or mishap.

Figure 7:
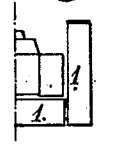
Fig. 7 is a diagrammatic half transverse section of a road bridge on a land site, made up of an essembly of central caissons of the normal bridge.
Figure 8:
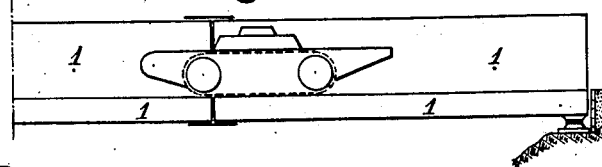
Fig. 8 is a longitudinal part section of a bridge of the same pattern that may be used for crossing fairly wide gaps (about 50 metres); on the right is represented a support on one of the edges of the gap; towards the middle is shown a connection between two sections.

The central caissons 1 may be designed so as to allow, in case of necessity, the formation of road bridge sections of large span that can be used over depressions in the ground (Figures 7 and 8) other than water stretches.

Figure 1:
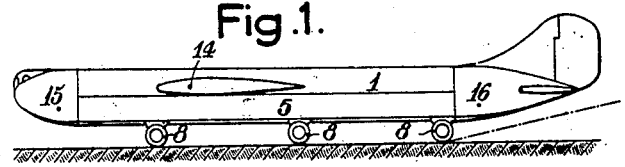
Fig. 1 shows a longitudinal elevation of a bridge-carrying glider in line of flight.
Figure 3:
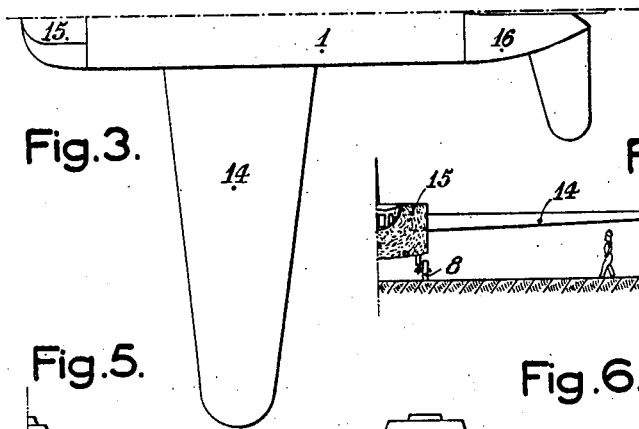
Fig. 3 shows a half-plan of a glider in flight.
Figure 4:
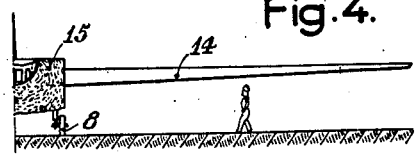
Fig. 4 shows a half-elevation of a glider in line of flight seen from the front.

The lightness of a section assembly allows figuring on transport by an aerial service. The cheapest means for carrying out this transport at the present time appears to lie in the construction of gliders (Figures 1, 3 and 4) but aeroplanes or hydroplanes could also be built for the purpose if such action were considered advisable.

A bridge section built of Duralumin forms the central portion of the glider fuselage. Wings 14 that may be put in position and dismantled easily will be attached at the proper time.

A cowl 15 constituting the front navigating room and a light tail 16 forming the rear unit and the rudders will be arranged at each end. Means are provided whereby the component parts may be quickly and simply taken apart.

For the construction of the bridge, each bridge section, comprising a central caisson 1 and two side caissons 5, is hauled on the body as shown in Fig. 11, to a shore of the water-way to be crossed, and placed in the position with the two side caissons extending laterally along the lateral faces of the central caisson, as shown in Figs. 10 and 9. Each bridge section is then launched to float on the water, as shown in Fig. 12, and disposed transversely in respect to the water-way. Another bridge section is disposed in the same manner end to end with the first bridge section. The lateral caissons 5 of the two adjoining sections are contiguous, but the abutting ends of the central caissons comprising the girderage, are rigidly connected to each other to form, lengthwise the two sections, a mechanically continuous girderage.

Two different arrangements for carrying out said rigid joining of the abutting edges of the two central caissons are hereinafter described with reference, respectively, to Fig. 14 or to Figs. 15 to 19.

According to the arrangement of Fig. 14, the junction of two consecutive section elements of the bridge is effected by a special arrangement one possible type of which is described later in connection with Figure 14. This method of joining produces at the same time continuity of the bridge platform and continuity of each of the platform supporting beams.

Each central caisson 1 carries at the lower part of each of its end faces and in line with the ends of each of the beams 2 a rod 22 firmly fixed to each beam and parallel to the lower edge of the caisson. At the upper part of this same side face each beam carries a ridge parallel to the rod 22 and presenting a horizontal bearing face facing downwardly a stud 19 facing in the same direction and a nut 23 adapted to be displaced in rotation with respect to the caisson about an axis perpendicular to the side face of the caisson under the action of a control member operated from above the caisson. This hook and this nut are located in a socket 26 formed in the beam and opening on the one side into the upper part of the side face and on the other side into the end of the upper face forming a support for the central caisson 1. Two caissons to be assembled being arranged end faces to end faces and the ends of the beams 2 so disposed as to form the extension of each other, a rigid piece is set in position between the opposite ends of each of the groups of two beams of two caissons arranged end to end, this rigid piece comprising an end 18 in the form of a fork, a stem 21, and a flat head 24. The part 18 in the form of a three-pronged fork is engaged about the oppositely placed rods 22 and the two caissons are thus rigidly connected by their lower edges. The stem 21 is placed vertically between the opposite ends of the two caissons and the two sides of its flat head bear respectively under the horizontal faces directed towards the bottom of the edges of the two caissons so that these two caissons are held against vertical movement with respect to each other. Two pieces 20, of which one end is formed into a hook and the other threaded, are engaged by their threaded parts in nuts 23 and by their hook ends about the studs 19 such that screwing up the nuts 23 brings together and joins the upper edges of the opposite flanks of the two caissons and completely immobilizes the head 24 of the vertical assembling piece between these two caissons. A cover-plate concealing the depression formed by the two sockets located end to end ensures at the same time the continuity of the platform and the protection of the coupling arrangements.

The five Figures 15–19 show a variation of the coupling system for two central caissons placed end face to end face. In the system a plate 21' is mounted in front of each of the end faces of the central caisson in such a manner as to be capable of being separated from and brought toward each end face by operating a control member arranged on the platform of the caisson. To this end the plate carries a certain number of screws 22' as shown in Fig. 17 in which are depicted four screws in the region of the plate intended to be mounted against the end of each beam. These screws engage the nuts 23' located in the end of each beam, the entry of each screw into the sheet iron 25' forming the external wall of the caisson being provided with a stuffing box to ensure water-tightness of the caisson. The nuts 23' supported by the fixed bearings 24' are provided with an external thread which engages with a worm-screw 29' controlled for example by a pinion, by a motor or by hand from above the platform of the caisson. Control of rotation of these nuts has the effect of bringing about movement of the screw 22' and consequently separating or drawing together the plate 21' and the end face of the caisson. The plate 21' is provided with longitudinal grooves 26', particularly visible in Fig. 17, which separate the regions of this plate which abut respectively the ends of each of the beams 2. The two caissons to be assembled are arranged end face to end face, end of beam opposite end of beam, and the two plates 21' are thus brought into contact, or almost so, with one another in such a manner that their grooves will be co-extensive, as shown in Fig. 15. I-shaped irons 28' are then engaged by their web portion in the grooves facing one another, the wings of these I-shaped irons being lodged in a recessed part, of suitable cross-sectional profile, of the plates 21'. By merely operating the member controlling the rotation of nuts 23', the screws 22' will be moved axially and this will bring the plates 21' forcibly against the end face of the corresponding caisson and as a result the wider end of each I-shaped iron 27' will grip this end face and engage it by truncated studs 28' entering into corresponding housings provided in the end face of the caisson. The two central caissons of two bridge sections disposed end to end of each other are then completely and rigidly assembled together.

Several methods of joining to the banks the rigid floating assembly constituted by the caissons joined together may be contemplated. In these different modes it is convenient to avoid an excessive sinking of one end of the assembly when a convoy enters upon the bridge over beams 32 hinged between studs 19 and dead body 33. A recommended system in which in particular the important variations in river level are without inconvenience in the working of the assembly is described hereafter with reference to Fig. 13.

Near the bank and along the length of the flank of the caisson near to this bank are disposed on base plates 31 posts 30 of adjustable height. The upper part 36 of each of these posts carries a vertical shaft 34 around which is mounted a strong spring 29. This spring 29 bears at its lower end against the upper part 36 of the post and supports at its other end a cap which covers the vertical shaft 34 and slides on this shaft and supports a hook 28. The flank facing the bank of the caisson near the bank is suspended from the hook 28 of a post 30 in line with the ends of the beams by the rod 22 fixed to each of these beams. A stud 38 fixed to the upper part 36 of each post is engaged in a guide 37 formed in the shaft of the hook 28 and guides the vertical movement of this hook at the time of passage of convoys over the bridge or variations of the river level.

An arrangement 35 closes the hook 28 to prevent, in the case of a rise of river level, the stud 38 leaving the curve of hook. The travel of this stud in the curve of the hook is chosen to be sufficient to avoid raising the foot before a rise in the level of the river has been noted and the adjustment of the height of the posts 30 has been effected in consequence.

In the event of any accident occurring to any portion of the bridge, the plates 21' may be quickly dismantled from the parts to which they properly belong so as to allow the withdrawal of the injured part.

What I claim is:

A bridge for spanning two shores situated on either sides of the bed of a water-way and permitting the passage of heavy convoys from one shore to the other, comprising a rigid floating portion terminating with two ends directed towards each shore respectively, a dead body on each of said shores, a pair of compound beams each hingedly connected with one end to one of said dead bodies and with the other end to that end of the floating portion which is directed towards the corresponding shore, a horizontal rod fixed to that end of said floating portion, metal posts adjustable in height and bearing on said bed of said water-way in the vicinity of said end of the floating portion, a helical spring mounted on each of said posts, a cap member mounted for vertical sliding movement on each of said posts and urged upwards by said helical spring, a hook member rigidly fast with said cap member and turned downwards parallel with said post, said horizontal rod fixed on said end of the floating portion engaging said hook members in order to cause said end of the floating portion to bear up on said bed of the waterway through said posts, cap members, hook members and also through said horizontal rod itself and therefore hold in position said end of the floating portion in relation to said bed independently of any variations both in the settling of said floating portion during the passage of said convoys thereupon and in the level of said water-way.

CHARLES ALEXIS MARIE EUGÈNE ODOT.

References Cited in the file of this patent

UNITED STATES PATENTS

| Number | Name | Date |
|---|---|---|
| 1,640,980 | Caroni | Aug. 30, 1927 |
| 2,157,959 | Knight | May 9, 1939 |
| 2,321,677 | Higgins | June 15, 1943 |
| 2,341,166 | Todd | Feb. 8, 1944 |
| 2,367,291 | Le Tourneau | Jan. 16, 1945 |
| 2,386,132 | McLarty | Oct. 2, 1945 |

FOREIGN PATENTS

| Number | Country | Date |
|---|---|---|
| 180,283 | Great Britain | Oct. 11, 1922 |

OTHER REFERENCES

Engineering News Record, April 20, 1944, pages 78–81.

Engineering News Record, February 8, 1945, page 131.